(12) United States Patent
McGuffin

(10) Patent No.: US 8,107,412 B2
(45) Date of Patent: Jan. 31, 2012

(54) GATELINK STARTUP CONTROLLED BY ACARS CMU

(75) Inventor: Thomas F. McGuffin, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 1107 days.

(21) Appl. No.: 11/835,861

(22) Filed: Aug. 8, 2007

(65) Prior Publication Data
US 2009/0040963 A1    Feb. 12, 2009

(51) Int. Cl.
*H04B 7/204*    (2006.01)
(52) U.S. Cl. .................. 370/325; 709/246
(58) Field of Classification Search .......... None
See application file for complete search history.

(56) References Cited

U.S. PATENT DOCUMENTS

| | | | |
|---|---|---|---|
| 4,901,307 A | 2/1990 | Gilhousen et al. | |
| 6,047,165 A | 4/2000 | Wright et al. | |
| 6,108,539 A | 8/2000 | Ray et al. | |
| 6,154,636 A | 11/2000 | Wright et al. | |
| 6,160,998 A | 12/2000 | Wright et al. | |
| 6,163,681 A | 12/2000 | Wright et al. | |
| 6,173,230 B1 | 1/2001 | Camus et al. | |
| 6,181,990 B1 | 1/2001 | Grabowsky et al. | |
| 6,195,189 B1 | 2/2001 | Nishihata et al. | |
| 6,259,379 B1 | 7/2001 | Paterson et al. | |
| 6,308,044 B1 * | 10/2001 | Wright et al. | 455/431 |
| 6,438,468 B1 | 8/2002 | Muxlow et al. | |
| 6,477,152 B1 | 11/2002 | Hiett | |
| 6,677,888 B2 * | 1/2004 | Roy | 342/36 |
| 6,760,778 B1 * | 7/2004 | Nelson et al. | 709/246 |
| 6,788,935 B1 | 9/2004 | McKenna et al. | |
| 6,795,408 B1 | 9/2004 | Hiett | |
| 6,816,728 B2 | 11/2004 | Igloi et al. | |
| 6,915,189 B2 | 7/2005 | Igloi et al. | |
| 6,965,816 B2 | 11/2005 | Walker | |
| 6,990,319 B2 | 1/2006 | Wright et al. | |
| 7,142,854 B1 * | 11/2006 | Kauffman et al. | 455/431 |
| 7,398,057 B2 * | 7/2008 | Stefani et al. | 455/68 |
| 7,519,014 B2 * | 4/2009 | Allen et al. | 370/310 |
| 2003/0003872 A1 * | 1/2003 | Brinkley et al. | 455/66 |
| 2003/0041155 A1 * | 2/2003 | Nelson et al. | 709/230 |
| 2004/0235469 A1 | 11/2004 | Krug | |
| 2005/0026609 A1 | 2/2005 | Brinkley et al. | |
| 2005/0143013 A1 | 6/2005 | Jha | |
| 2005/0221814 A1 | 10/2005 | Fagan et al. | |
| 2005/0286452 A1 | 12/2005 | Hardgrave et al. | |
| 2006/0031394 A1 | 2/2006 | Tazuma | |
| 2006/0080451 A1 * | 4/2006 | Eckert | 709/230 |
| 2006/0178141 A1 | 8/2006 | McGuffin et al. | |
| 2007/0183435 A1 * | 8/2007 | Kettering et al. | 370/401 |
| 2008/0144617 A1 * | 6/2008 | Molsberry et al. | 370/389 |

OTHER PUBLICATIONS

Avionica, "Securelink",, pp. 1-2, Publisher: Avionica.
Carlos et al., "Wi-Fi Gatelink Trial Frankfurt and Muich, Germany White Paper", Aug. 9, 2006, pp. 1-18, Publisher: ARINC Proprietary.

(Continued)

*Primary Examiner* — Chi Pham
*Assistant Examiner* — Kouroush Mohebbi
(74) *Attorney, Agent, or Firm* — Fogg & Powers LLC

(57) ABSTRACT

Methods and apparatus' for operating a communication system between an aircraft and a communication center are provided. One method includes using an aircraft communication addressing and reporting system (ACARS) of an aircraft to control a gatelink communication system of the aircraft.

20 Claims, 4 Drawing Sheets

OTHER PUBLICATIONS

Eklund et al., "IEEE Standard 802.16: A Technical Overview of the Wirelessman Air Interface for Broadband Wireless Access", "IEEE Communications Magazine", Jun. 2002, pp. i-107, Publisher: IEEE.

Hardy et al, "Aircraft Network and File Server—ARINC 763", Oct. 16, 2002, pp. 1-12, Publisher: AEEC (Airlines Electronic Engineering Committee).

"Technical Overview for Mark III Communications Management Unit (CMU)",, pp. 1-59, Publisher: Honeywell Aerospace Electronic Systems.

Hurlburt et al, "A Data Communications Concept for a SATS Scenario", "4th Integrated CNS Technologies Conference and Workshop", Apr. 2004, pp. 1-20.

Ivancic, "Modular, Cost-Effective, Extensible Avionics Architecture for Secure Mobile Communications", "2006 IEEE Aerospace Conference—Mar. 4-11, 2006 Big Sky, Montana", 2006, pp. 1-9, Publisher: IEEE.

Teledyne Technologies Inc., "Wireless Groundlink System (WGL)", "www.teledyne-controls.com/productsolution.wirelessgroundlink.groundlink.asp", 2007, pp. 1-2, Publisher: Teledyne Technologies Inc.

Teledyne Technologies Inc., "New Release", "www.teledyne-controls.com/newscenter/sco.asp", 2007, pp. 1-2, Publisher: Teledyne Technologies Inc.

* cited by examiner

GATELINK STARTUP CONTROLLED BY ACARS CMU

BACKGROUND

Communications between an aircraft and a ground station such as an airport are vital to operations. One type of communication system is the aircraft communication addressing and reporting system (ACARS). ACARS is a digital datalink system designed to transmit relatively small messages between an aircraft and a ground station via radio or satellite. One of the initial applications for the ACARS system was to detect and report changes to the flight events which includes out of gate, off the ground, on the ground and into the gate. These flight events are commonly referred to as "Out", "Off", "On" and "In" (OOOI) events. In addition to OOOI events other information may be transmitted based on a select detected OOOI event such as information relating to engine, aircraft, operational performance conditions, load and balance. Moreover, information can be transmitted from the ground station to the airplane based on a detected OOOI event. Such information may include flights plans and weather information. The ACARS is controlled by a communication management unit (CMU). One of the functions of the CMU is to route downlinks by means of the most efficient air-ground sub network. The sub networks include very high frequency (VHF) which is the most commonly used and least expensive, satellite communications (SATCOM) which provides worldwide coverage except in the polar regions but is fairly expensive, and high frequency (HF) which provides coverage in the polar regions. As stated above, the amount of data in the communications using ACARS has to be relatively small due to communication technology restraints.

For faster downloads, aircraft gatelink systems have been developed that use 802.11 or cell phone communications. This allows for greater amounts of data to be communicated between the airplane and the airline ground system. Such data could include more extensive aircraft data, databases and operational software as well as other data that requires a relatively large bandwidth. The aircraft gatelink, however, must be disabled during flight for fight safety reasons. Accordingly, all the data transmissions must be communicated when the airplane is on the ground within the communication range of a gatelink network. One method of engaging a gatelink system is by using weight on wheels (WOW) sensors to determine when the aircraft is on the ground. An issue that needs to be addressed at busy hub airports involves controlling when aircrafts are allowed to access the gatelink system in order to maintain a relatively high throughput. Another issue with gatelink systems is that the cost of using gatelinks varies from airport to airport depending on who owns and operates the gatelink installation at that airport. For example, if the airport facility owns and operates the gatelink installation then it can be more costly to use than if the gatelink network is operated by the airline itself.

For the reasons stated above and for other reasons stated below which will become apparent to those skilled in the art upon reading and understanding the present specification, there is a need in the art for an efficient and effective control system that provides more finesse in determining when to enable the gatelink system than just using a WOW sensor.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a method of operating a communication system between an aircraft and a communication center is provided. The method includes using an aircraft communication addressing and reporting system (ACARS) of an aircraft to control a gatelink communication system of the aircraft.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
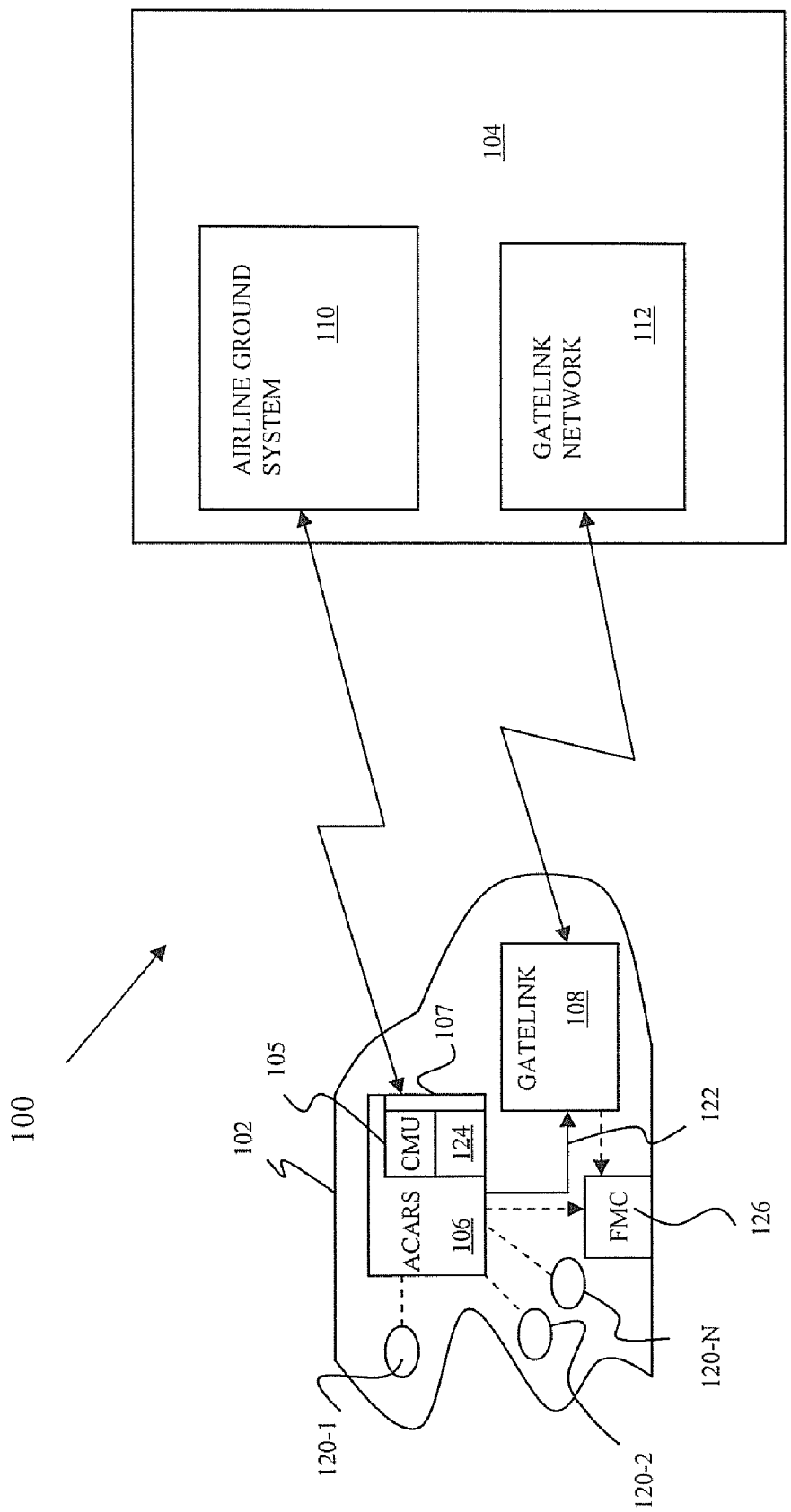
FIG. 1 is a block diagram of an aircraft communication system of one embodiment of the present invention.

Embodiments of the present invention provide an effective and efficient way of controlling gatelink avionics with an aircraft's ACARS system. Referring to FIG. 1, an aircraft communication system 100 of one embodiment is illustrated. As illustrated, the communication system 100 includes an aircraft 102 and a communication center 104 such as an airport 104. The aircraft 102 includes an ACARS system 106, gatelink avionics 108 (or gatelink), sensors 120 (1-N) and a flight management computer (FMC) 126. The ACARS system 106 includes a CMU 105, a transceiver 107 and a memory 124. The CMU or controller 105 of the ACARS 106 controls operations of the ACARS 106. The transceiver 107 transmits and receives signals to and from a remote unit such as an airline ground system 110 in the communication center 104. The memory 124 is used to store data such as flight number and destination. The sensors 120 (1-N) are used to detect OOOIevents. As illustrated, outputs of the sensors 120 (1-N) are in communication with the ACARS 106. The FMC 126 uses flight plan data, aircraft systems data and navigation data to calculate aircraft present position as well as pitch, roll and thrust commands required to fly an optimal profile from airport A to airport B. As illustrated, the FMC 126 is in communication with both the ACARS 106 and the gatelink 108 to receive flight plane data and the like.

As discussed above, in embodiments, the ACARS 106 controls the use of the gatelink 108. A suitable interface 122 is coupled between the ACARS 106 and the gatelink 108. The interface 122 could be a simple discrete signal or it could be a datalink interface such as ARINC 429, Ethernet or the like. In one embodiment, the interface 122 conveys network IDs and encryption/authentication keys in addition to enabling the gatelink 108. Further as discussed above, the communication center 104 includes an airline ground system 110 that is in communication with the ACARS 106. The communication center 104 also includes the gatelink network 112 that is in communication with the gatelink 108 when the gatelink 108 is activated and within communication range.

In one embodiment, a software function in the airline ground system 110 uses a standard OOOI event (such as "On" or "In") as signaled by the ACARS 106 to detect that the aircraft 102 is on the ground. In response to the OOOI event signal, the airline ground system 110 compares a list of airports where the aircraft 102 is permitted to use gatelink (usually because of cost). In one embodiment, the airport 104 will be identified with an "On" message, and if the aircraft 102 is at one the airports on the list then a datalink message is sent to the ACARS 106 directing the ACARS to enable the gatelink 108. That is, in this embodiment, if the aircraft 102 is to use the gatelink 108 at this particular airport 104, the airline ground system 110 signals the ACARS 106 to activate the gatelink 108. In response to the signal from the airline ground system 110, the ACARS 106 activates the gatelink 108. If the airport 104 identified with the "On" message is not an airport at which it is allowed to use gatelink then no message is sent to the ACARS 106 and gatelink 108 remains disabled.

In another embodiment, a list of airports in which the gatelink is to be activated is stored in the memory 124 of the ACARS 106. In this embodiment, when the aircraft 102 lands at an airport, the CMU 105 checks the list. If the airport 104 is on the stored list then the gatelink 108 is activated; otherwise it remains disabled. The stored list can be updated via communications between the airline ground system 110 and the ACARS 106.

Figure 2:
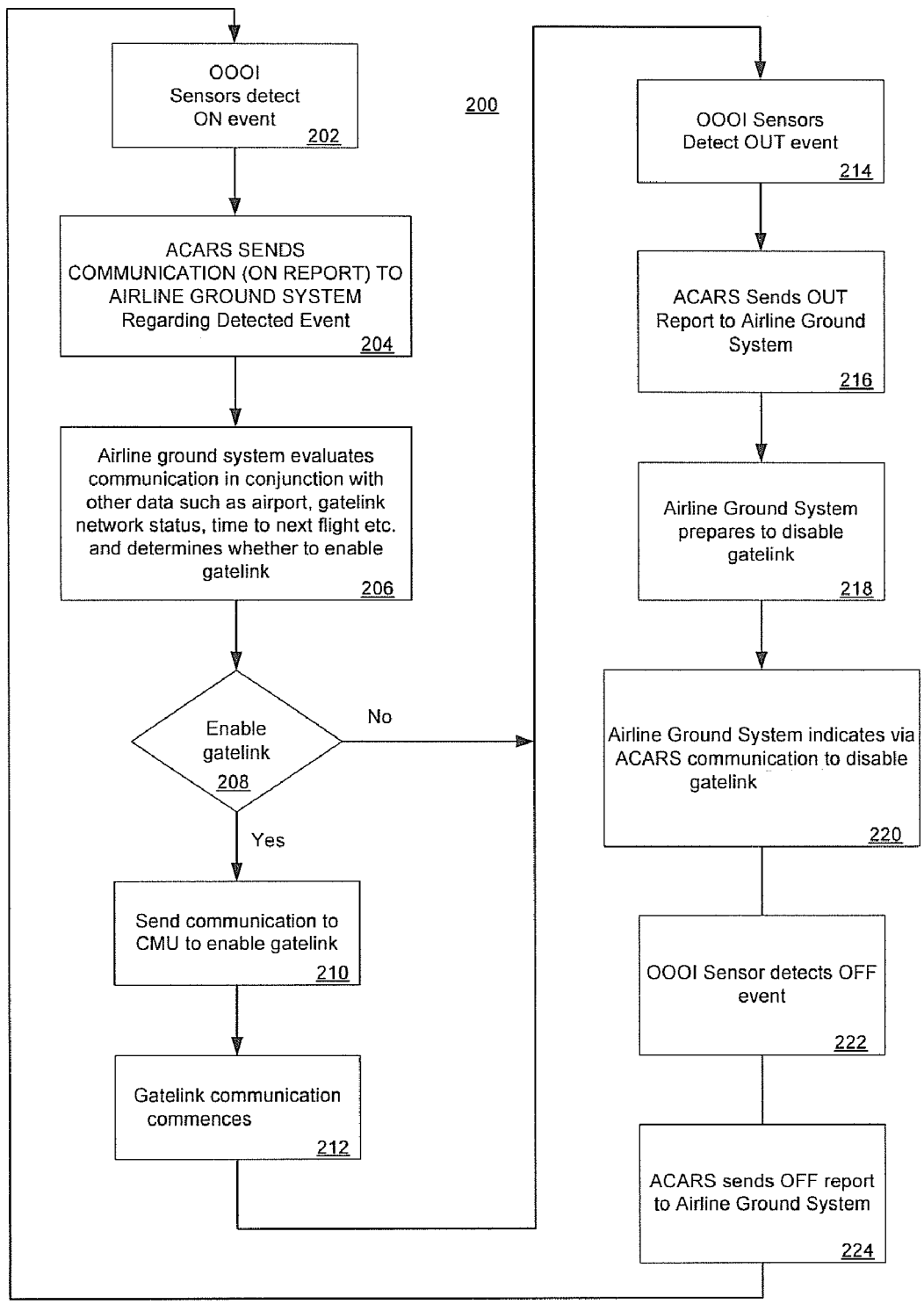
FIG. 2 is a flow diagram illustrating one method of operating a gatelink of one embodiment of the present invention.

Referring to FIG. 2, a gatelink flow diagram 200 illustrating one method of operating a gatelink is provided. As illustrated, the process begins when the sensors detect an OOOI event (202). The typical OOOI event used would be either the "On" which occurs when the aircraft lands on the ground or the "In" which occurs when the aircraft parks at the gate. In response to sensors detecting a select event, an arrival signal is sent from the ACARS to an associated airline ground system (204). In response to the arrival signal, the airline ground system evaluates whether it should enable gatelink (206) based on techniques as discussed above. If the airline ground system determines to enable gatelink then it sends a message to the ACARS regarding the use of the gatelink (208). If it is determined to not use the gatelink (208), the ACARS is used to communicate. In this situation, the airline has chosen to only transfer operational data such as flight plan data and forgo uploading or downloading more extensive data such as maintenance records or navigation database. If it is determined to use the gatelink (208), the gatelink is enabled by the ACARS (210). Communications are then exchanged via the gatelink and gatelink network (212). In some embodiments, ACARS communications and gatelink communications can occur simultaneously when the gatelink is enabled.

In one embodiment, the OOOI sensors are monitored to determine if an OOOI event has occurred (214). In this embodiment, the OOOI events monitored at this point relate to an event that indicates the aircraft has left the gate or is about to take off or has taken off such as the "Pushback", "Out", and "Off" events. If an event has not been detected (214), communications between the gatelink and gatelink network continues at (212). If a "Pushback" or "Out" event is detected (214) then an ACARS message containing an OOOI report is sent to the airline ground system (216). This informs the airline ground system that the flight is beginning and use of the gatelink system should be terminated ASAP (218). The airline ground system completes its gatelink communication ASAP and sends a message to the avionics to disable gatelink (220). If a subsequent disable event is detected (222) and gatelink is still enabled then gatelink is disabled (220). An example of a subsequent disable event is provided with the use of an embodiment where the CMU contains backup logic to automatically disable the gatelink after a certain amount of time has passed from the detection of the "Out" event. This embodiment provides backup via the disable event in case the message from the airline ground system is not received.

Figure 3:
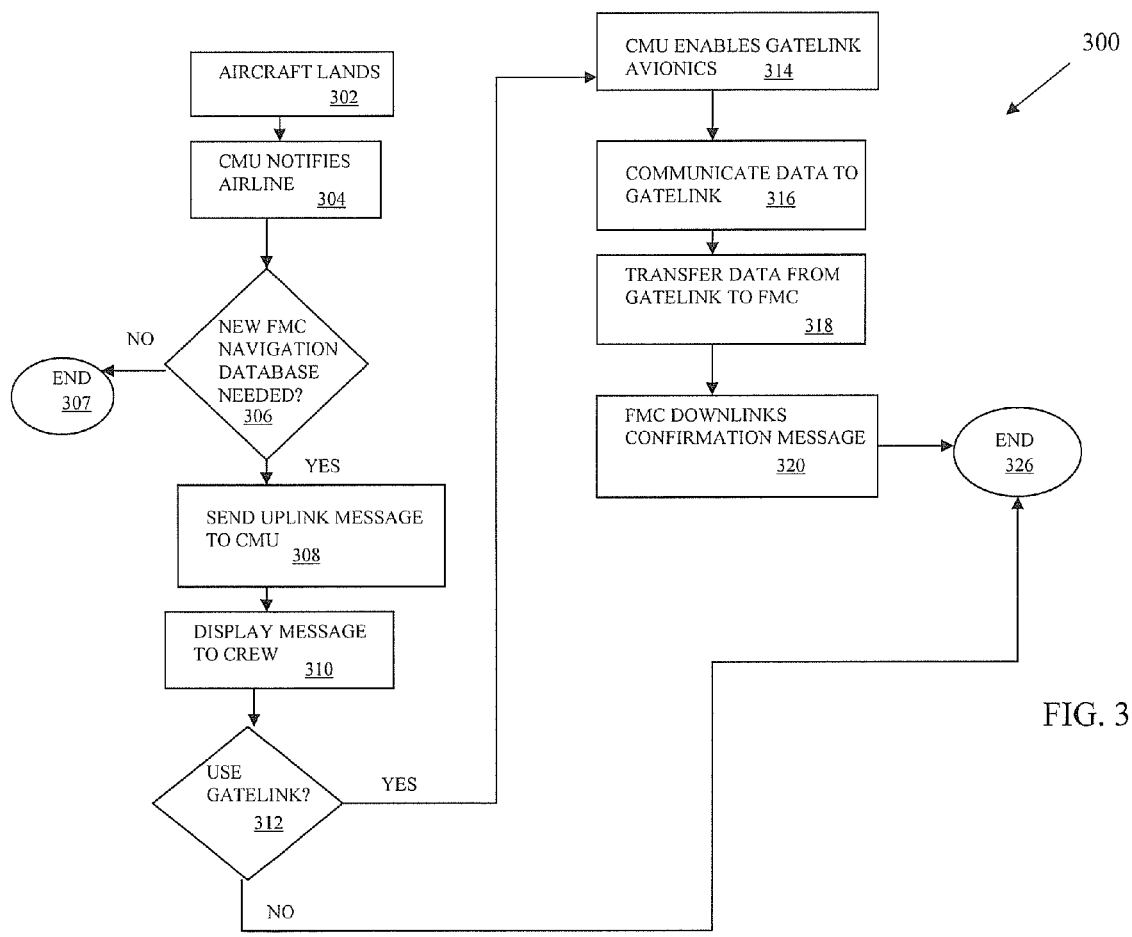
FIG. 3 is a flow diagram illustrating one decision making method of an airline ground system function embodiment of FIG. 2.

An example of an embodiment that uploads an FMC navigation database is illustrated in the upload flow diagram 300 of FIG. 3. In this embodiment, the aircraft lands at an airport where use of gatelink is permitted (302). The CMU of the ACARS notifies the airline ground system that the plane has landed (304). In one embodiment, the CMU determines the aircraft has landed via sensors. Upon receiving the ACARS message, the airline ground system determines if a new FMC navigation database is needed (306) and if the aircraft turn around is long enough to accomplish this task. If a new navigation database is not needed the process is deferred and ends for now (307). If a new navigation database is needed but the turn around time is too short, the process is deferred until a latter time (307). If a new navigation database is needed and the turn around time is sufficient (306), a send uplink message is sent to the CMU (308). In one embodiment, a message is then displayed to the crew regarding the new FMC navigation database (310). If the crew accepts (312), then the CMU of the ACARS enables the gatelink avionics (314). The data is then communicated to the gatelink (316). The gatelink then transfers the data (the FMC navigation database) to a FMC of the aircraft (318). The FMC then indicates that a new database has been loaded either via an ACARS message and/or by a display to the flight crew (320). The process then ends (326). If the loading of the FMC navigation database is rejected by the crew (312), then that action is deferred to a future opportunity. The process then ends (326).

Figure 4:
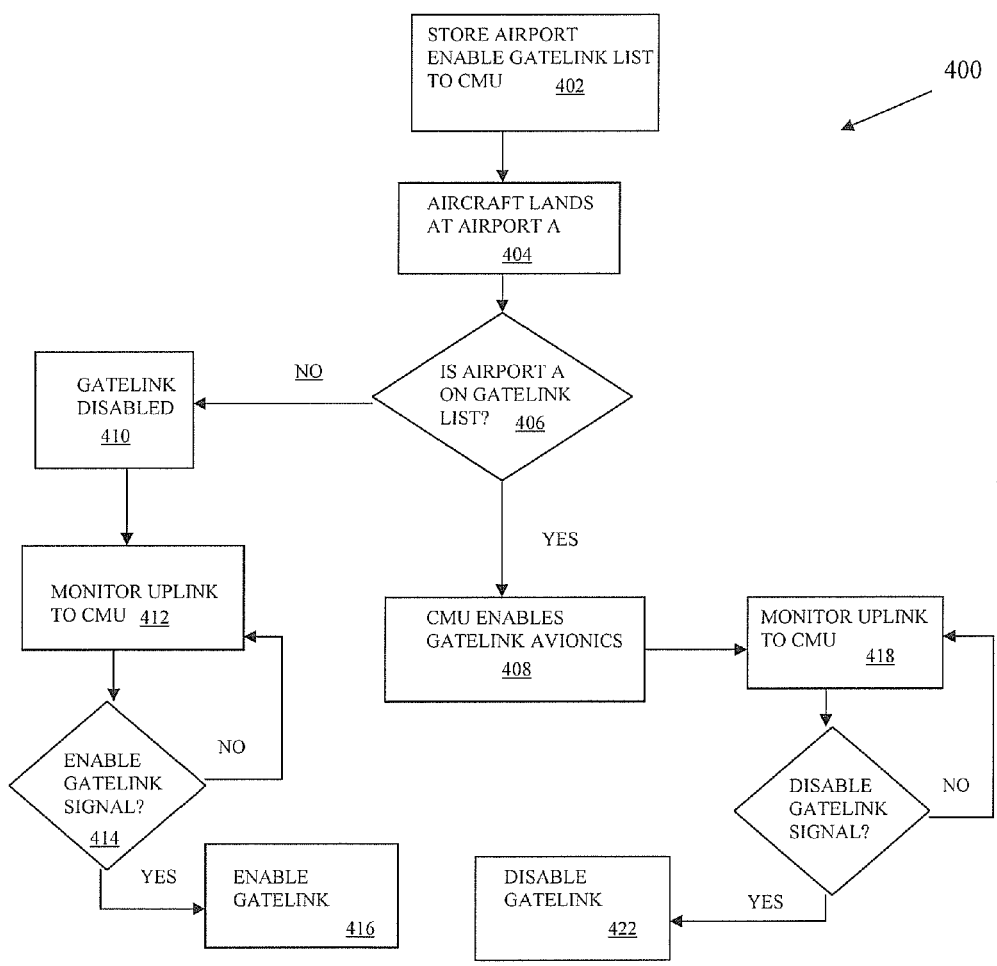
FIG. 4 is a flow diagram illustrating another decision making method employed by an airline ground system function embodiment of FIG. 2.

Another example of a gatelink flow diagram is illustrated in FIG. 4. In this embodiment, an airport enable list is stored in the memory of the ACARS (402). This can be done at any communication center. Moreover, it could be updated at anytime via an ACARS message. As the flow diagram 400 illustrates, an aircraft having the stored airport enable list lands at airport A. The CMU then determines if airport A is on the list (406). If it is not on the list (406), the gatelink remains disabled (410). In one embodiment, the uplink of the CMU of the ACARS is then monitored (412) for an enable gatelink signal (414). If an enable gatelink signal is detected (414), the gatelink is enabled (416). If an enable gatelink signal is not detected (414), the CMU uplink is continued to be monitored at (412) until the aircraft departs. If the airport is on the list (406), the gatelink is enabled by the CMU (408). In one embodiment, the uplink of the CMU of the ACARS is then monitored (418) for a disable gatelink signal (420). If a disable gatelink signal is detected (420), the gatelink is disabled (422). If a disable gatelink signal is not detected (420), the CMU uplink is continued to be monitored at (418). If gatelink is still enabled when the aircraft begins to depart then the CMU will follow the process described in FIG. 2 for disabling gatelink.

The methods and techniques used by the ACARS 106, the gatelink 108 as well as other devices as described above can be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method of operating a communication system between an aircraft and a communication center, the method comprising:
using an aircraft communication addressing and reporting system (ACARS) of the aircraft to enable or disable a gatelink communication system of the aircraft based on a detection of an out, off, on, and in (OOOI) event;
wherein the OOOI event is one of an out of gate, off ground, on ground, or into gate event.

2. The method of claim 1, further comprising:
sending an arrival message to the communication center based on the detected OOOI event, wherein the OOOI event indicates the aircraft has arrived at the communication center.

3. The method of claim 2, wherein the arrival message is sent by the ACARS to an airline ground system of the communication center.

4. The method of claim 3, wherein using an ACARS of the aircraft to enable or disable a gatelink further comprises:
sending an enable message to the ACARS from the airline ground system based on the received arrival message; and
in response to the enable message, enabling the gatelink to communicate with a gatelink network.

5. The method of claim 4, wherein enabling the gatelink further comprises passing at least one of network IDs, encryption keys and authentication keys from the ACARS to the gatelink.

6. The method of claim 2, further comprising:
detecting an OOOI event that indicates the aircraft is leaving; and
disabling the gatelink via the ACARS in response to the detected event.

7. The method of claim 1, further comprising:
storing an enable gatelink airport list in a memory of the ACARS, and
automatically enabling the gatelink communication system at airports in the gatelink airport list.

8. The method of claim 1, wherein using an ACARS of the aircraft to enable or disable a gatelink further comprises:
monitoring an uplink to a communication management unit (CMU) of the ACARS for a disable gatelink signal; and
upon detection of the disable gatelink signal, disabling the gatelink.

9. The method of claim 7, further comprising:
when at an airport not on the gatelink airport list, monitoring an uplink to the CMU of the ACARS for an enable signal; and
upon detection of the enable signal, enabling the gatelink.

10. A method of transferring data between an aircraft and a communication center, the method comprising:
monitoring out, off, on, and in (OOOI) events for an arrival signal with an aircraft communication addressing and reporting system (ACARS);
upon detection of the arrival signal, notifying an associated airline ground system of the arrival with the ACARS;
determining if data needs to be communicated between the aircraft and the airline ground system;
when data needs to be communicated, providing a communication message to a CMU of the ACARS;
determining if a gatelink communication system is to be used for at least a portion of the communication;
when the gatelink communication system is to be used for at least a portion of the communication, enabling a gatelink with the ACARS; and
communicating between the aircraft and the communication center with the enabled gatelink.

11. The method of claim 10, further comprising:
when the gatelink communication system is not to be used, communicating between the aircraft and the airline ground system via the ACARS.

12. The method of claim 10, further comprising:
displaying a message to a crew of the aircraft regarding data to be communicated.

13. The method of claim 10, wherein enabling a gatelink with the ACARS further comprises passing at least one of network IDs, encryption keys and authentication keys from the ACARS to the gatelink.

14. The method of claim 10, wherein determining if data needs to be communicated between the aircraft and the airline ground system further comprises:
determining if a flight management computer (FMC) navigation database needs to be uploaded to the aircraft.

15. The method of claim 14, further comprising:
when the gatelink is to be used, the FMC navigation database received by the gatelink is downloaded to a FMC of the aircraft; and when the gatelink is not to be used, communicating the FMC navigation database to the ACARS and then transferring the FMC navigation database to the FMC of the aircraft.

16. A communication system for an aircraft, the system comprising:
   a gatelink communication system configured to communicate with a gatelink network when within range of the gatelink network;
   at least one sensor configured to sense data that verifies the proximity of the aircraft to a communication center that includes the gatelink network, wherein an out, off, on, and in (OOOI) event is determined based at least in part on the data from the at least one sensor;
   an ACARS configured to communicate with an airline ground system of the communication center, the ACARS further configured to enable or disable the gatelink based at least in part on the OOOI event.

17. The system of claim 16, further comprising:
   a flight management computer (FMC) in communication with the ACARS and the gatelink of the aircraft to receive updated FMC navigation databases.

18. The system of claim 16, wherein the ACARS is configured to control the gatelink via an interface that includes at least one of a discrete signal and a datalink interface.

19. The system of claim 16, wherein the ACARS further comprises a memory configured to store an enable gatelink airport list.

20. The method of claim 10, further comprising:
   monitoring OOOI events for a departure signal with the ACARS; and
   upon detection of the departure signal, disabling the gatelink with the ACARS.

* * * * *